US012656975B2

(12) United States Patent　　(10) Patent No.:　US 12,656,975 B2
En Gad et al.　　　　　　　　　　(45) Date of Patent:　　Jun. 16, 2026

(54) SEPARATION OF PARITY COLUMNS IN BIT-FLIP DECODING OF LOW-DENSITY PARITY-CHECK CODES WITH PIPELINING AND COLUMN PARALLELISM

(71) Applicant: Micron Technology, Inc., Boise, ID (US)

(72) Inventors: Eyal En Gad, Highland, CA (US); Mustafa N. Kaynak, San Diego, CA (US); Sivagnanam Parthasarathy, Carlsbad, CA (US); Yoav Weinberg, Thornhill (CA)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/743,629

(22) Filed: Jun. 14, 2024

(65) Prior Publication Data

US 2024/0338146 A1　　Oct. 10, 2024

Related U.S. Application Data

(63) Continuation of application No. 17/556,080, filed on Dec. 20, 2021, now Pat. No. 12,014,071.

(51) Int. Cl.
　　*H03M 13/00*　　　　(2006.01)
　　*G06F 3/06*　　　　　(2006.01)
(52) U.S. Cl.
　　CPC .......... G06F 3/0655 (2013.01); G06F 3/0604 (2013.01); G06F 3/0679 (2013.01)
(58) Field of Classification Search
　　CPC .... G06F 3/0679; G06F 3/0655; G06F 3/0604; H03M 13/1191
　　See application file for complete search history.

(56) References Cited

U.S. PATENT DOCUMENTS

| | | | | |
|---|---|---|---|---|
| 8,028,216 | B1 * | 9/2011 | Yeo .................... | H03M 13/6362 |
| | | | | 714/755 |
| 8,549,384 | B1 * | 10/2013 | Huang ................ | G06F 11/1012 |
| | | | | 714/48 |
| 9,141,471 | B2 * | 9/2015 | Murakami .......... | H03M 13/611 |
| 9,236,886 | B1 * | 1/2016 | Zhu .................... | H03M 13/6561 |
| 9,348,599 | B2 * | 5/2016 | Busaba ................ | G06F 9/3844 |
| 9,584,157 | B2 * | 2/2017 | Murakami ............ | H03M 13/23 |
| 9,785,502 | B2 * | 10/2017 | Zamir ................. | G06F 11/1048 |
| 10,063,258 | B2 * | 8/2018 | Goldenberg ........ | H03M 13/612 |
| 10,089,177 | B2 | 10/2018 | Bazarsky et al. | |

(Continued)

OTHER PUBLICATIONS

D.J.C. MacKay, S.T. Wilson, and M.C. Davey. Comparison of constructions of irregular gallager codes. IEEE Transactions on Communications, 47(10):1449-1454, 1999.

Hangxuan Cui, Jun Lin, and Zhongfeng Wang, "Information storage bit-flipping decoder for LDPC codes", IEEE Transactions on Very Large Scale Integration (VLSI) Systems, 28(11):2464-2468, 2020.

R. Gallager, "Low-density parity-check codes," IRE Transactions on Information Theory, 8(1):21-28, 1962.

(Continued)

*Primary Examiner* — Esaw T Abraham

(74) *Attorney, Agent, or Firm* — Greenberg Traurig

(57)　　　　　ABSTRACT

A memory device having a bit-flipping decoder. The decoder having a plurality of circuits operable to perform parallel computation to decode a codeword according to a plurality of columns of a parity matrix. The decoder is configured to provide columns of the parity matrix for processing in the plurality of circuits in an order where columns processed concurrently by the plurality of circuits in pipeline stages include no more than one parity column of the parity matrix.

20 Claims, 6 Drawing Sheets

(56) References Cited

U.S. PATENT DOCUMENTS

| | | | |
|---|---|---|---|
| 10,103,751 | B2 | 10/2018 | Morero et al. |
| 10,187,083 | B2 * | 1/2019 | Calder .............. H03M 13/2945 |
| 10,379,940 | B2 * | 8/2019 | Fainzilber ........... G06F 11/1016 |
| 10,459,798 | B2 * | 10/2019 | Lingarajappa ........ G06F 3/0689 |
| 10,530,392 | B2 * | 1/2020 | Reynwar ............ H03M 13/1145 |
| 10,530,393 | B2 | 1/2020 | Ryabinin et al. |
| 10,644,725 | B1 | 5/2020 | Walke et al. |
| 10,727,869 | B1 | 7/2020 | Walke et al. |
| 11,206,043 | B2 | 12/2021 | Asadi et al. |
| 11,212,789 | B2 | 12/2021 | Zhang et al. |
| 11,249,846 | B2 * | 2/2022 | Zeng ................... H03M 13/616 |
| 11,316,532 | B1 * | 4/2022 | Hsu .................... H03M 13/1145 |
| 12,014,071 | B2 | 6/2024 | En Gad et al. |
| 2023/0195358 | A1 | 6/2023 | En Gad et al. |

OTHER PUBLICATIONS

Tadashi Wadayama, Keisuke Nakamura, Masayuki Yagita, Yuuki Funahashi, Shogo Usami, and Ichi Takumi, "Gradient descent bit flipping algorithms for decoding LDPC codes", IEEE Transactions on Communications, 58 (6):1610-1614, 2010.

Z. Li, L. Chen, L. Zeng, S. Lin, and W. Fong. Efficient encoding of quasi-cyclic low-density parity-check codes. IEEE Transactions on Communications, 53(11):1973-1973, 2005.

Separation of Parity Columns in Bit-Flip Decoding of Low-Density Parity-Check Codes with Pipelining and Column Parallelism, U.S. Appl. No. 17/556,080, filed Dec. 20, 2021, Confirmation: 1071, Status Date: May 29, 2024, Status: Patented Case, Inventors: Eyal En Gad, et al.

* cited by examiner

100

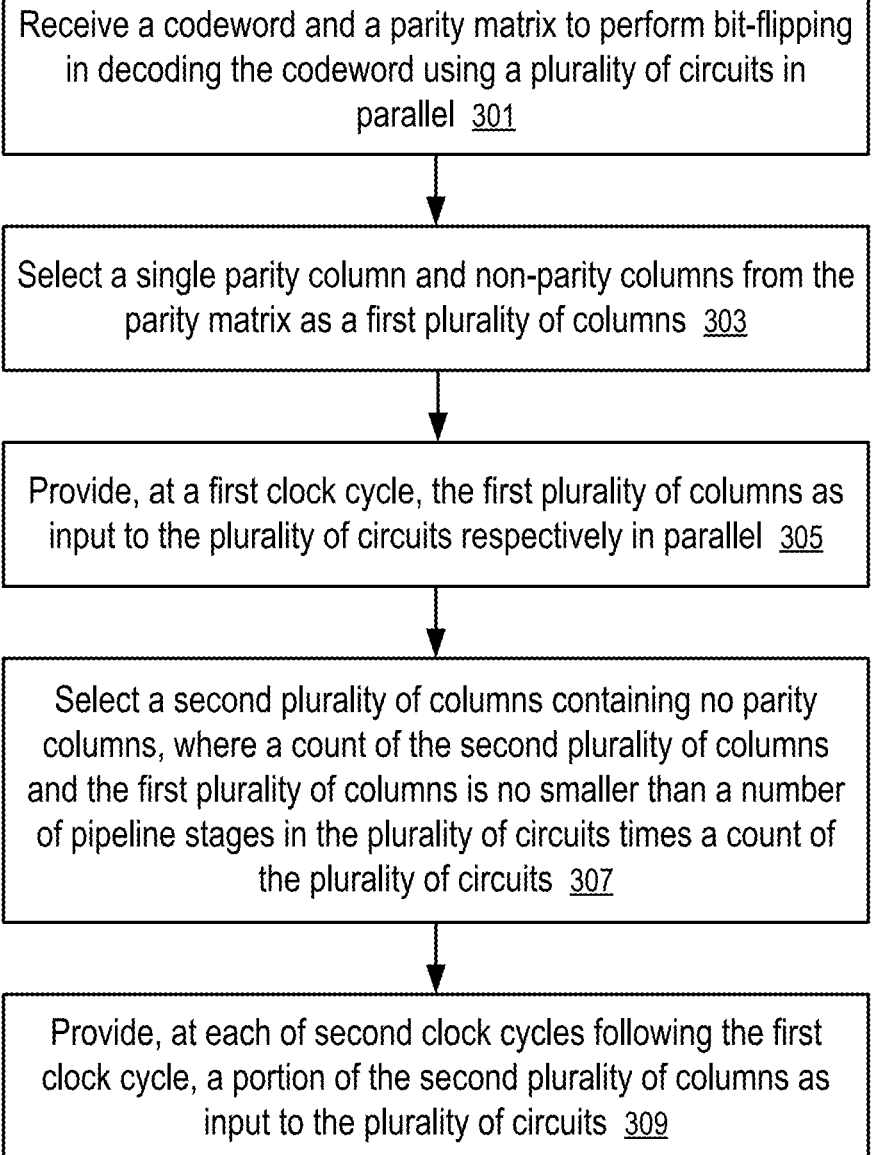

Receive a codeword and a parity matrix to perform bit-flipping in decoding the codeword using a plurality of circuits in parallel 301

Select a single parity column and non-parity columns from the parity matrix as a first plurality of columns 303

Provide, at a first clock cycle, the first plurality of columns as input to the plurality of circuits respectively in parallel 305

Select a second plurality of columns containing no parity columns, where a count of the second plurality of columns and the first plurality of columns is no smaller than a number of pipeline stages in the plurality of circuits times a count of the plurality of circuits 307

Provide, at each of second clock cycles following the first clock cycle, a portion of the second plurality of columns as input to the plurality of circuits 309

FIG. 5

SEPARATION OF PARITY COLUMNS IN BIT-FLIP DECODING OF LOW-DENSITY PARITY-CHECK CODES WITH PIPELINING AND COLUMN PARALLELISM

RELATED APPLICATIONS

The present application is a continuation application of U.S. patent application Ser. No. 17/556,080 filed Dec. 20, 2021 and issued as U.S. Pat. No. 12,014,071 on Jun. 18, 2024, the entire disclosures of which application are hereby incorporated herein by reference.

TECHNICAL FIELD

At least some embodiments disclosed herein relate to memory systems in general, and more particularly, but not limited to bit flipping decoders of low-density parity-check (LDPC) codes used in memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 5 shows a method to decode a codeword of a low-density parity-check (LDPC) code according to one embodiment.

DETAILED DESCRIPTION

Figure 1:
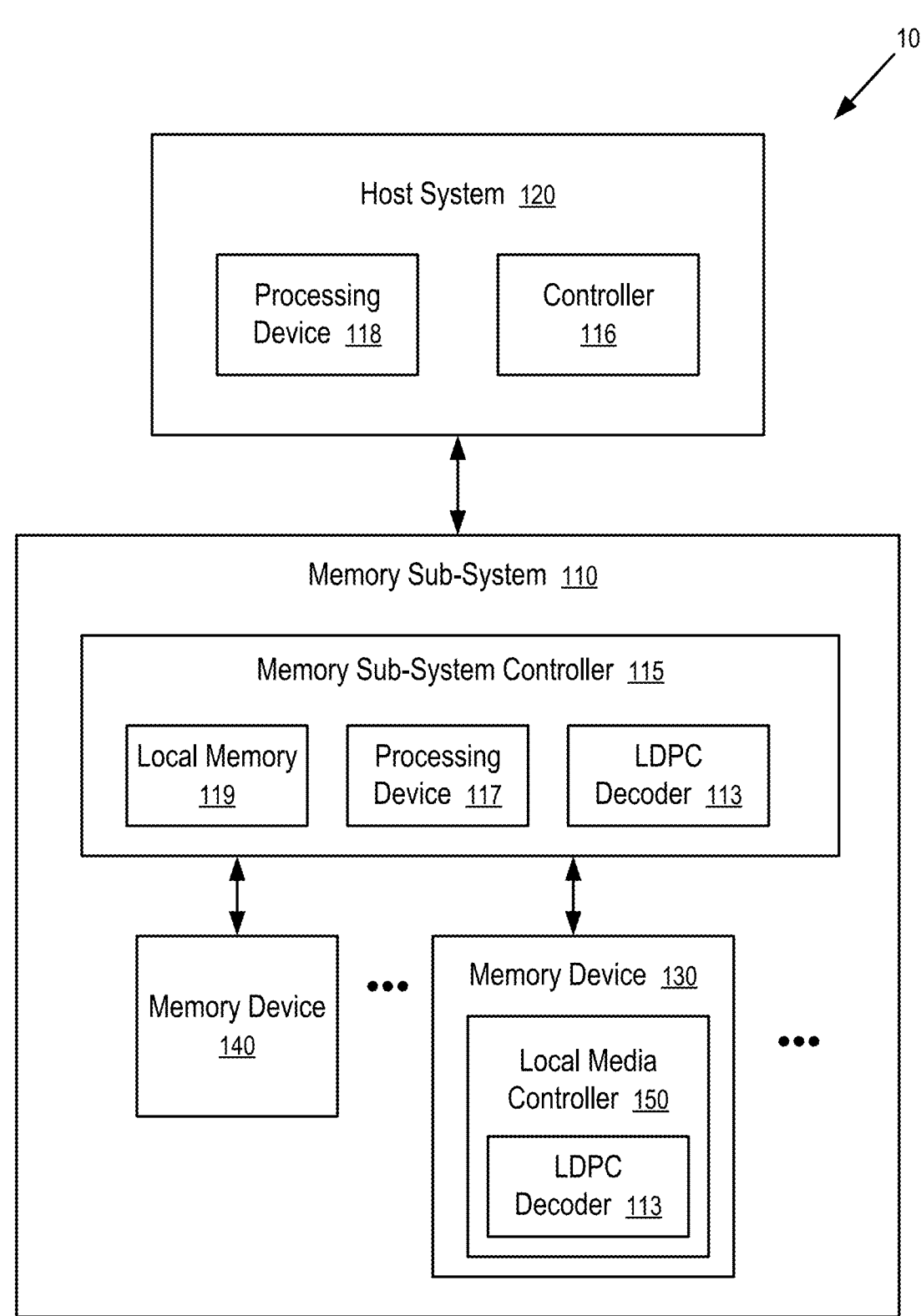
FIG. 1 illustrates an example computing system having a memory sub-system in accordance with some embodiments of the present disclosure.

At least some aspects of the present disclosure are directed to a memory sub-system configured to decode, through bit flipping, low-density parity-check (LDPC) codewords with parity column separate for improved performance. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A conventional memory device can use an error correction code (ECC) to store user data together with redundant information to improve the reliability of recovering the user data from memory cells. A low-density parity-check (LDPC) code is an example of error correction codes. An LDPC code can be used to generate a set of parity bits from a number of bits of user data according to a parity matrix. The combination of the parity bits and the bits of the user data provides a codeword that has a number of parity relations among the bits of the codeword. The parity matrix specifies which subsets of the bits of the user data are used to compute the corresponding parity bits; and the parity relations among the bits identified by the parity matrix can be checked to determine whether the codeword has an error.

After programming a group of memory cells to have states representative of an LDPC codeword generated from user data, the states of the memory cells can be checked in a read operation to determine a retrieved codeword represented by the current states of the memory cells. The retrieved codeword can have a small number of bits that have erroneous values. The presence of the erroneous bits causes the retrieved codeword to violate one or more of the parity relations or constraints identified by the parity matrix. A bit-flipping LDPC decoder can flip some of the bits in the codeword to identify a correct codeword that satisfies the parity constraints and thus decode the retrieved codeword to user data represented by the corrected codeword.

In hardware implementations of the bit-flipping LDPC decoders, columns of the parity-check matrix are typically processed sequentially, where the number of failed parity checks in each column is used to decide whether to flip the bit in the retrieved codeword that corresponds to the column.

To improve throughput, it is useful to pipeline the column processing and to process multiple columns in parallel in separate processing units. For example, a pipeline processing arrangement can include the counting of the number of failed parity checks in one clock cycle, while the bit flipping in the retrieved codeword and the updating of its syndrome can be performed in one or more subsequent clock cycles. After the updating, the counting of failed parity checks can be performed for the subsequent column. The pipeline and/or parallel processing can improve throughput, but degrade accuracy when many columns receive outdated syndrome state, compared to a standard sequential processing, especially for parity-check matrices having high row overlaps between subsequent columns.

At least some aspects of the present disclosure address the above and other deficiencies by reordering columns of a parity matrix to separate parity columns in pipeline processing and in parallel processing of bit flipping. When the techniques are applied to quasi-cyclic LDPC codes, the reordering can be applied over blocks of columns, where the block size corresponds to the size of the cycle.

For example, consider a parity matrix of an LDPC code that is used to compute r parity bits. Each row of the parity matrix has columns of ones and zeros for the corresponding bits in the codeword. A bit in the codeword having a value of one in the row indicates that the bit is involved in the computation of the parity bit corresponding to the row; and a bit in the codeword having a value of zero in the row indicates that the bit is not in the subset of bits used to compute the parity bit. The column in the row corresponds to the parity bit is a parity column. Thus, the parity matrix has r parity columns.

A hardware implementation of a bit-flipping decoder can have p parallel processing units; and each processing unit can have s pipeline stages.

For efficient hardware implementations of column reordering, column i of the parity matrix is assigned to processing unit j such that j is equal to i modulo p.

As an input to the reordering operation, the parity matrix can be arranged to have r parity columns followed by non-parity columns. The columns of the parity matrix can be reordered for processing by the s pipeline stages in the p parallel processing units of the bit-flipping decoder to reduce and/or eliminate concurrent processing of more than two parity columns.

The parity matrix columns can be arranged in the form of cycle blocks, and pipeline blocks.

A cycle block has p columns of the parity matrix. The p columns in the cycle block can be provided to the p processing units respectively for processing at the same clock cycle; and the p parity matrix columns can be processed in parallel at any same stage in the p parallel processing units. To avoid row overlaps in parallel processing by the processing units of the bit flipping decoder, each parity column is placed in a separate cycle block. At most one of the p columns in the cycle block is a parity column; and the other columns in the cycle block are non-parity columns. A cycle block having a parity column can be referred to as a parity cycle block; and a cycle block having no parity column can be referred to as a non-parity cycle block.

cycle blocks can be arranged in a sequence to provide inputs to the p parallel processing units one cycle at a time; and the cycle blocks advance through the s processing stages one cycle at a time. To avoid pipeline row overlaps, at least s−1 non-parity cycle blocks are placed between two closest parity cycle blocks. For convenience and/or simplicity, each closest pair of parity cycle blocks are separated by s−1 non-parity cycle blocks. Thus, the r parity cycle blocks can be scheduled for processing at cycles 0, s, . . . , s·(r−1) respectively.

Since the processing units have s stages, s consecutive cycle blocks can be considered a pipeline block. When the cycle blocks are grouped into consecutive, non-overlapping pipeline blocks, the leading r pipeline blocks start with the r parity cycle blocks respectively, each followed by s−1 non-parity cycle blocks.

Thus, each pipeline block contains no more than one parity cycle blocks. A pipeline block having a parity cycle block can be referred to as a parity pipeline block; and a pipeline block having no parity cycle block can be referred to as a non-parity pipeline block.

By arranging the processing order of parity matrix columns in the cycle blocks and pipeline blocks as input to the parallel processing units with pipelines, the parity columns are separated to avoid concurrent processing two parity columns in two processing units and/or in two different stages of a processing unit. Avoiding concurrent processing of parity columns can improve the accuracy of the bit flipping decoder in decoding codewords.

When the number of columns in the parity matrix is more than p·s·(r−1), the columns in the parity matrix can be organized into r parity pipeline blocks for complete separation of parity columns. When the number of columns in the parity matrix is less than p·s·(r−1), some of the pipeline blocks can be configured to have more than one parity cycle blocks.

Optionally, the non-parity columns of the parity matrix can be assigned to cycle blocks for processing at earliest available cycles, with columns having smaller indices being processed earlier than columns having larger indices.

For example, a codeword can have n bits corresponding to n columns of the parity matrix. The codeword has r bits of parity bits that are arranged as bits 0, 1, . . . , r−1 of the codeword. Thus, columns 0, 1, . . . , r−1 columns of the codeword are parity columns that are arranged as parity columns of cycle blocks of pipeline blocks 0, 1, . . . , r−1. Thus, when i is from 0 to r−1, column i of the parity matrix is a parity column and thus scheduled for processing at cycles 0, s, . . . , s·(r−1) for processing by processing units j=i mod p.

When i is from r to p·r−1, column i can be assigned to a cycle block for processing by processing unit j=i mod p at an earliest available parity cycle block. When i is from p·r to n, column i can be assigned to an earliest available non-parity cycle block.

Consider an example of a bit flipping decoder having r=5 parity columns, p=3 parallel processing units, and s=4 pipeline stages. The parity columns are columns 0, 1, . . . , 4 of the parity matrix. Without reordering, columns 0, 1, 2 are scheduled for processing units 0, 1, 2 at cycle 0; columns 3, 4, 5 at cycle 1; columns 6, 7, 8 at cycle 2; etc. Concurrent processing of parity columns 0, 1, 2 in processing units 0, 1, 2 respectively can reduce accuracy.

To avoid concurrent processing of parity columns 0, 1, . . . , 4, parity columns 1, 2, . . . , 4 are assigned to parity cycle blocks processed at cycles 4, 8, . . . , 16, without changing the processing units used to process the columns. Non-parity columns 5, 6, . . . , 14 are rescheduled to respective earliest available parity cycle blocks. For example, columns 0, 7, 5 are assigned for parity cycle block scheduled to be processed at cycle 0; columns 6, 1, 8 for parity cycle block at cycle 4; columns 9, 10, 2 for parity cycle block at cycle 8; etc. Non-parity columns 15, 16, 17 can be assigned to non-parity cycle block scheduled at cycle 1; columns 18, 19, 20 at cycle 2; columns 21, 22, 23 at cycle 3; etc. Thus, the parity columns are in separate cycle blocks; and parity cycle blocks are separated by s−1=3 non-parity cycle blocks.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, or any other interface. The physical host interface can be used to transmit data between the host system 120 and the memory sub-system 110. The host system 120 can further utilize an NVM express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), spin transfer torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include an LDPC decoder 113 configured with column reordering for separation of parity columns in parallel processing of columns during bit flipping. In some embodiments, the controller 115 in the memory sub-system 110 includes at least a portion of the LDPC decoder 113. In other embodiments, or in combination, the controller 116 and/or the processing device 118 in the host system 120 includes at least a portion of the LDPC decoder 113. For example, the controller 115, the controller 116, and/or the processing device 118 can include logic circuitry implementing the LDPC decoder 113. For example, the controller 115, or the processing device 118 (processor) of the host system 120, can be configured to execute instructions stored in memory for performing the operations of the LDPC decoder 113 described herein. In some embodiments, the LDPC decoder 113 is implemented in an integrated circuit chip disposed in the memory sub-system 110. In other embodiments, the LDPC decoder 113 can be part of firmware of the memory sub-system 110, an operating system of the host system 120, a device driver, or an application, or any combination therein.

For example, the LDPC decoder 113 can have a plurality of processing units that can operate in parallel on columns of a parity matrix in bit flipping calculations. Each of the processing units can have a plurality of stages for processing operations associated with different columns of the parity matrix in parallel. The LDPC decoder 113 is configured to process columns of the parity matrix in an order such that among a plurality of columns processed in parallel in the processing units and in the pipeline stages, there is no more than one parity column from the parity matrix.

Figure 2:
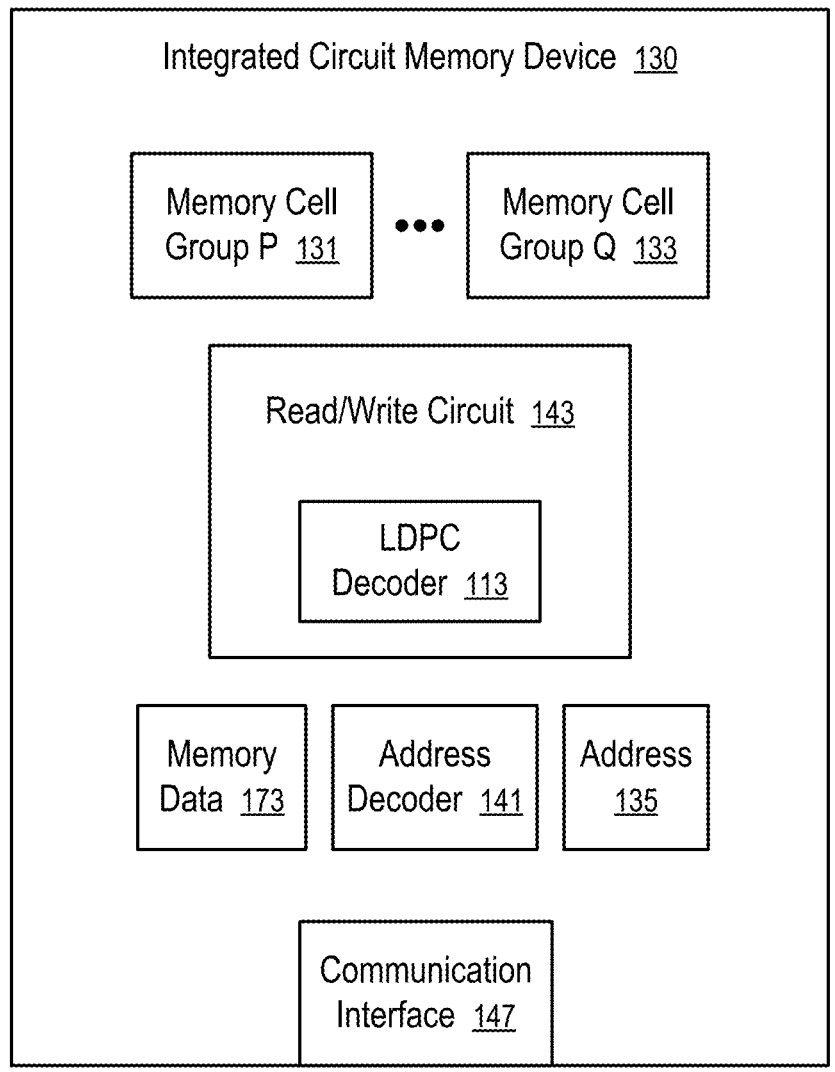
FIG. 2 illustrates an integrated circuit memory device having a low-density parity-check (LDPC) decoder according to one embodiment.

FIG. 2 illustrates an integrated circuit memory device 130 having a low-density parity-check (LDPC) decoder 113 according to one embodiment. For example, the memory devices 130 in the memory sub-system 110 of FIG. 1 can be implemented using the integrated circuit memory device 130 of FIG. 2.

The integrated circuit memory device 130 can be enclosed in a single integrated circuit package. The integrated circuit memory device 130 includes multiple groups 131, . . . , 133 of memory cells that can be formed in one or more integrated circuit dies. A typical memory cell in a group 131, or group 133, can be programmed to store one or more bits of data.

Some of the memory cells in the integrated circuit memory device 130 can be configured to be operated together for a particular type of operations. For example, memory cells on an integrated circuit die can be organized in planes, blocks, and pages. A plane contains multiple blocks; a block contains multiple pages; and a page can have multiple strings of memory cells. For example, an integrated circuit die can be the smallest unit that can independently execute commands or report status; identical, concurrent operations can be executed in parallel on multiple planes in an integrated circuit die; a block can be the smallest unit to perform an erase operation; and a page can be the smallest unit to perform a data program operation (to write data into memory cells). Each string has its memory cells connected to a common bitline; and the control gates of the memory cells at the same positions in the strings in a block or page are connected to a common wordline. Control signals can be applied to wordlines and bitlines to address the individual memory cells.

The integrated circuit memory device 130 has a communication interface 147 to receive a command having an address 135 from the controller 115 of a memory sub-system 110, retrieve memory data 173 from memory cells identified by the memory address 135, and provide at least the memory data 173 as part of a response to the command. The memory device 130 can decode the memory data 173 using the LDPC decoder 113 and provide the decoded data as part of a response to the command. An address decoder 141 of the integrated circuit memory device 130 converts the address 135 into control signals to select a group of memory cells in the integrated circuit memory device 130; and a read/write circuit 143 of the integrated circuit memory device 130 performs operations to determine the memory data 173 stored in the memory cells at the address 135.

Figure 3:
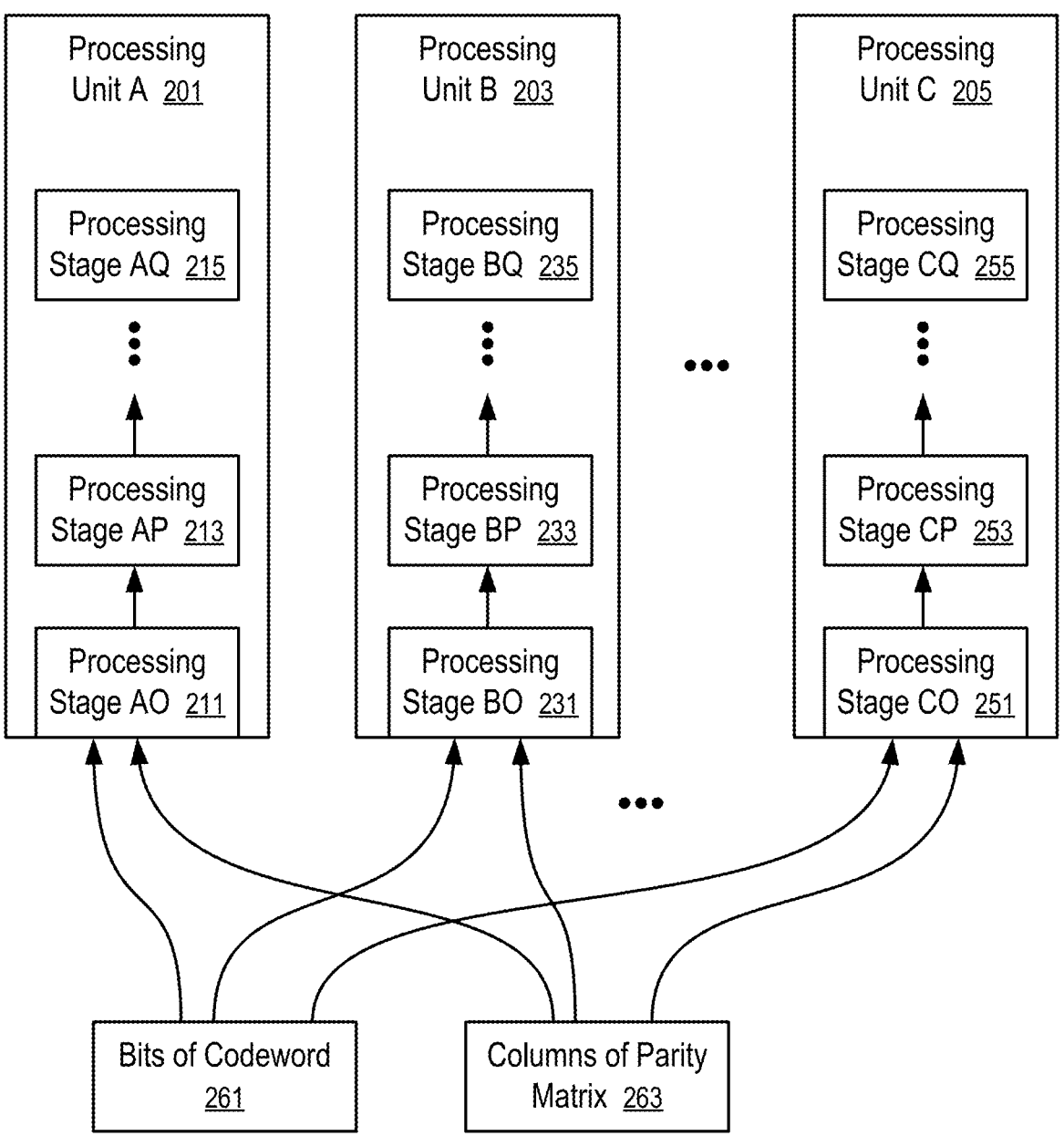
FIG. 3 illustrates a low-density parity-check (LDPC) decoder configured to decode with parity column separation according to one embodiment.
Figure 4:
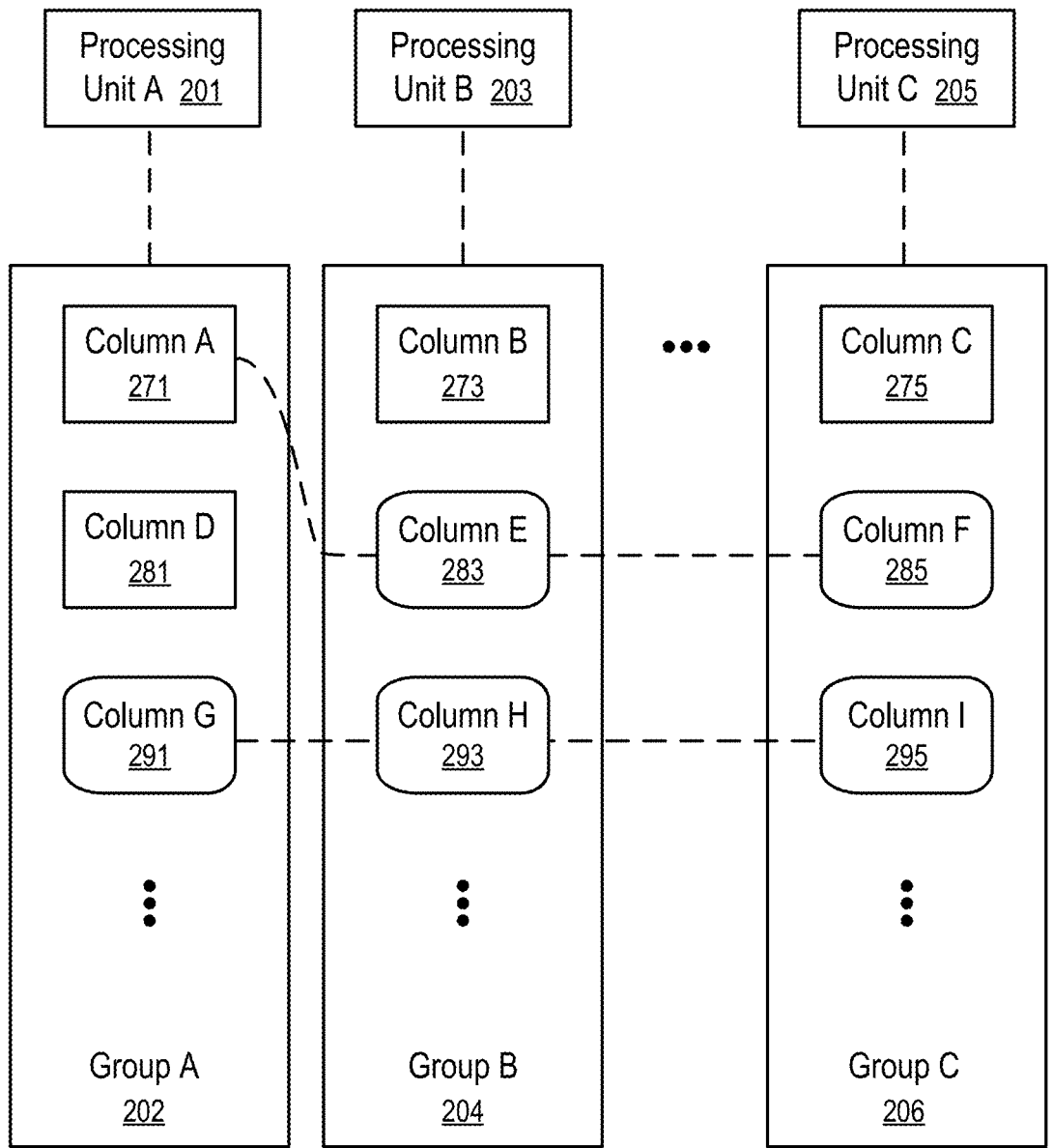
FIG. 4 shows a technique to assign columns of a parity matrix for processing in a low-density parity-check (LDPC) decoder according to one embodiment.

In at least some embodiments, the LDPC decoder 113 is a bit flipping decoder that can change the order of columns of a parity matrix for parallel processing to avoid concurrent processing of parity columns in a same stage in different processing units, or different stages in one or more processing units, as illustrated in FIG. 3 and FIG. 4.

FIG. 3 illustrates a low-density parity-check (LDPC) decoder configured to decode with parity column separation according to one embodiment.

For example, the LPDC decoder 113 of FIG. 1 and/or FIG. 2 can be implemented using the decoder of FIG. 3.

In FIG. 3, the LPDC decoder 113 is configured to decode a codeword having bits 261 according to a parity matrix having columns 263.

For example, each bit 261 of the codeword corresponds to a corresponding column 263 in the parity matrix; and each row in the parity matrix identifies a subset of bits in the codeword that have a value of one in the corresponding column of the row. The subset is to satisfy a parity constraint. A parity bit in the subset is the XOR of the other bits in the subset; and the XOR of the subset is equal to zero.

For a given codeword bit 261, the corresponding parity matrix column 263 can be processed to determine the number for violations of parity constraints that involve the codeword bit 261. A processing unit (e.g., 201, 203, . . . , or 205) can perform operations to determine whether to flip the value of the codeword bit 261 (e.g., changing from one to zero, or from zero to one) based on the corresponding parity matrix column 263.

The computations for the decision and flipping of the codeword bit 261 can be arranged to be performed in multiple pipeline stages. In an iteration of bit flipping a codeword bit 261, data associated with the corresponding parity matrix column 263 goes through the pipeline stages (e.g., from processing stages 211, 213, . . . , to 215; or from processing stages 231, 233, . . . , to 235; or from processing stages 251, 253, . . . , to 255). Different columns can be processed in different pipeline stages of the same processing unit (e.g., 201, 203, or 205). When the decoder of FIG. 3 has p parallel processing units 201, 203, . . . , 205, each having s processing stages (e.g., 211, 213, . . . , 215; or 231, 233, . . . , 235; or 251, 253, . . . , 255), the decoder can process a maximum of p·s columns in parallel.

The decoder of FIG. 3 can arrange to process the parity matrix columns 263 in an order that avoids concurrent processing of more than one parity column in the processing stages 211, 213, . . . , 215; 231, 233, . . . , 235; . . . , and 251, 253, . . . , 255 of the processing units 201, 203, . . . , 205.

For example, the column ordering scheme illustrated in FIG. 4 can be used to avoid concurrent processing of more than one parity column in the decoder.

FIG. 4 shows a technique to assign columns of a parity matrix for processing in a low-density parity-check (LDPC) decoder according to one embodiment, such as a decoder FIG. 3.

In FIG. 4, a continue sequence of columns 271, 273, . . . , 275, 281, 283, . . . , 285, 291, 293, . . . , 295, etc.

is arranged into groups 202, 204, and 206 for assigning to the processing units 201, 203, . . . , 205 respectively.

The p processing units 201, 203, . . . , 205 are numbered sequentially from 0 to p−1; and the columns 271, 273, . . . , 275, 281, 283, . . . , 285, 291, 293, . . . , 295, etc. of the parity matrix can be sequentially number from 0, 1, . . . , to n. Thus, column i is assigned to a group correspond to i mod p processing unit.

The first r columns (e.g., 271, 273, . . . , 275, 281) of the parity matrix are parity columns that correspond parity bits 261 in the codeword. To separate the parity blocks, a parity column (e.g., 271) is paired with p−1 non-parity columns (e.g., 283, . . . , 285) to form a parity cycle block that can be provided as an input to the processing units 201, 203, . . . , 205 at the same clock cycle. The parity cycle block (e.g., having columns 271, 283, . . . , 285) is configured to be followed by s−1 non-parity cycle blocks (e.g., having columns 291, 293, . . . , 295) to from a parity pipeline block. When the parity matrix columns 263 are provided in such an order for processing in the LDPC decoder 113, the parallel processing of multiple parity columns can be avoided. Avoid such parallel processing of multiple parity columns can improve the accuracy of the decoder 113.

In FIG. 4, a rows of column among the groups 202, 204, . . . , 206 represents a set of columns that would be provided to the processing units 201, 203, . . . , 205 in a cycle without column reordering. For example, without column reordering, columns 271, 273, . . . , 275 in a row across the groups 202, 204, . . . , 206 would be provided to the processing units 201, 203, 205 in a same clock cycle. To avoid the concurrent processing of the parity columns 271, 273, . . . , 275, the row orders of the columns within the groups 202, 204, . . . , 206 are adjusted such that each adjusted row (e.g., a row having columns 271, 283, . . . , 285) has no more than one parity column (e.g., 271).

In one implementation, the row orders in different groups are adjusted differently for the first r rows, such that each row contains only one parity column. The remaining rows contain only non-parity columns; each of the non-parity columns can be inserted between rows having parity columns to provide parity column separation across pipeline stages.

For example, let r be the number of parity columns to distribute; let s be the number of pipeline stages; and let p be degree of column parallelism. Hardware implementation efficiency can be improved via maintaining the column indices modulo p. Thus, column i is mapped into a column j such that i is j(mod p). With this arrangement the hardware is to lookup in a smaller permutation for each congruence class.

Columns can be partitioned into cycle blocks (CB), each containing p consecutive columns which are processed by the decoder in the same cycle. For example, for p=2, column indices 0 and 1 are processed in the first cycle, columns 2 and 3 are processed in the second cycle, and so on. Each parity column is placed in its own CB, to avoid row overlaps. Denote a CB that contains a parity column as parity CB and other CBs as non-parity CBs. To avoid pipeline row overlaps, place (s−1) non-parity CBs between two consecutive parity CBs. This way, the reordered columns are partitioned into parity pipeline blocks (parity PBs), each containing s CBs, the first of which contains a parity column while the remaining s−1 CBs that do not contain a parity column.

Each PB contains sp columns, one of which is a parity column. Since there are r parities in a codeword, there are r parity PBs. For simplicity, place the r parity blocks first in the matrix, such that the first spr columns are parity PBs, while the rest of the columns remain in their original positions and are not reordered. Therefore, the reordering function maintains the position of a column whose index i is outside of the reordering region (e.g., i>spr−1). The number of columns in the matrix is to be greater than ps(r−1) in order to completely separate the parity columns.

Each of the r parity CBs contains a single parity column and p−1 other columns. As the parity columns are those of index 0 to r−1, let the non-parity columns in the parity CBs to be the next (p−1) r columns, i.e. those of index r to pr−1. Consequently, the non-parity CBs in the parity PBs contain the columns of index pr to spr−1. Place them in their original order for simplicity. Additionally, this allows the index of these columns modulo p to be maintained for reduced hardware complexity.

For a column at index i in a non-parity CB inside a parity PB, there are $b_i$+1 parity CB proceeding it in the matrix. Consequently, there are $p(b_i+1)$ columns in parity CB before it; and thus, there are $i−p(b_i+1)$ columns in non-parity CB before it. Since the first column in non-parity CB is mapped to pr, it follows that any column in a non-parity CB is mapped to $pr+i−p(b_i+1)=i+p(r−b_i−1)$.

Consider the reordering for columns in parity CBs. Let $r_i$=i mod sp be the index of column i within its PB. Consider the placement of the parity column. To satisfy the requirement that the reordering maintains the column index modulo p, a parity column $b_i$ is placed at index $b_i$ mod p of its CB. So if i is in a parity CB (meaning i<spr and $r_i$<p) and i=$b_i$(mod p), then the column index in location i is $b_i$.

A remaining case is that of a non-parity column in a parity CB for the placement of columns r to pr−1. A non-parity column in the first CB can take the smallest index f such that f>r−1 and f=i(mod p). Such index is given by f=r+((i−r)mod p). For other parity CBs, the index modulo p needs to be maintained, and therefore the index can be obtained by adding a multiple of p to f. Denote the factor of p to add as x, such that the reordered index is f+xp. The value x is the difference between $b_i$ and the number p' of parity columns placed in index i mod p in the previous parity CBs. It can be seen that p' is the closest integer that is no greater than $(b_i+p−r_i)/p$. Combining this expression, the column reordered to index i is $r+((i−r)$ mod $p)+p(b_i−p')$.

In summary, the reordering rules of the implementation are:

(1) if $b_i$>r−1 (non-parity PB), return i;

(2) otherwise, if $r_i$>p−1 (non-parity CB inside a parity PB), return i+p(r−$b_i$1);

(3) otherwise, if i is $b_i$(mod p) (parity column), return $b_i$;

(4) otherwise (non-parity column), return i is $r+((i−r)$mod p)+p($b_i$−p'), where p' is the closest integer that is no greater than $(b_i+p−r_i)/p$.

In another implementation, each parity column (e.g., 271) in a group (e.g., 202) can exchange its row order with a non-parity column (e.g., 271) on an initial row having not parity columns (e.g., 291, 293, . . . , 295). The exchange results in a re-ordered row (e.g., having columns 271, 293, . . . , 295) that has only one parity column (e.g., 291). Such a re-ordered row forms a parity cycle block; and similar exchanges can lead to r parity cycle blocks; and the remaining rows become non-parity cycle blocks. The order of the cycle blocks can be adjusted to separate each pair of parity cycle blocks by at least s−1 non-parity cycle blocks.

FIG. 5 shows a method to decode codewords of a low-density parity-check (LDPC) code according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 is performed at least in part by the controller 115 and/or the local media controller 150 of the memory sub-system 110 in FIG. 1, and/or by the processing device 118 of the host system 120. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 5 can be implemented via operations performed by LDPC decoder 113 using the technique of FIG. 3 and/or FIG. 4.

At block 301, the LDPC 113 decoder receives a codeword and a parity matrix to perform bit-flipping in decoding the codeword using a plurality of circuits in parallel.

For example, the plurality of circuits can include parallel processing units 201, 203, . . . , 205. For example, the plurality of circuits can include processing stages 211, 213, . . . , 215.

For example, the codeword can have bits 261, including a plurality of user data bits that generally have no redundant information and a plurality of parity bits that provides redundant information about the user data bits. The parity matrix can have a plurality of columns, each corresponding to one of the bits 261 of the codeword. Each parity column of the parity matrix corresponds to one of the plurality of parity bits; and each non-parity column of the parity matrix corresponds to one of the plurality of user data bits. Each row of the parity matrix specifies a parity constraint involving a parity bit.

At block 303, the LDPC decoder 113 selects a single parity column and non-parity columns from the parity matrix as a first plurality of columns.

At block 305, the LDPC decoder 113 provides, at a first clock cycle, the first plurality of columns as input to the plurality of circuits respectively in parallel.

At block 307, the LDPC decoder 113 selects a second plurality of columns containing no parity columns, where a count of the second plurality of columns and the first plurality of columns is no smaller than a number of pipeline stages in the plurality of circuits times a count of the plurality of circuits.

At block 309, the LDPC decoder 113 provides, at each of second clock cycles following the first clock cycle, a portion of the second plurality of columns as input to the plurality of circuits.

The operations in blocks 303 to 309 can be repeated to process all parity columns, separated by non-parity columns. No more than one parity column is processed in parallel in the pipeline stages in the plurality of circuits.

At each of the first clock cycle and the second clock cycles, the plurality of circuits process the first plurality of columns respectively in one of the pipeline stages. The processing of a column in one of the plurality of circuits advances one stage at a clock cycle; and after the second clock cycles, the processing of the column for bit-flipping is complete in the current iteration. Multiple iterations can be performed to decode the codeword.

For simplicity, in reordering the columns for processing by the plurality of circuits, the LDPC decoder 113 is configured to assign each respective column of the parity matrix to one of the plurality of circuits for processing identified based on an index of the respective column in the parity matrix modulo a count of the plurality of circuits. For example, an index of the circuit assigned to process the column can be equal to the index of the column modulo the total number of the circuits.

In general, the techniques of bit-flipping decoders discussed above can also be used in decoding codewords outside of a memory sub-system. For example, LDPC decoder 113 can be used in wireless communication and optical communication, where information is transmitted in the form of LDPC codewords containing redundant information generated according to a parity matrix.

Figure 6:
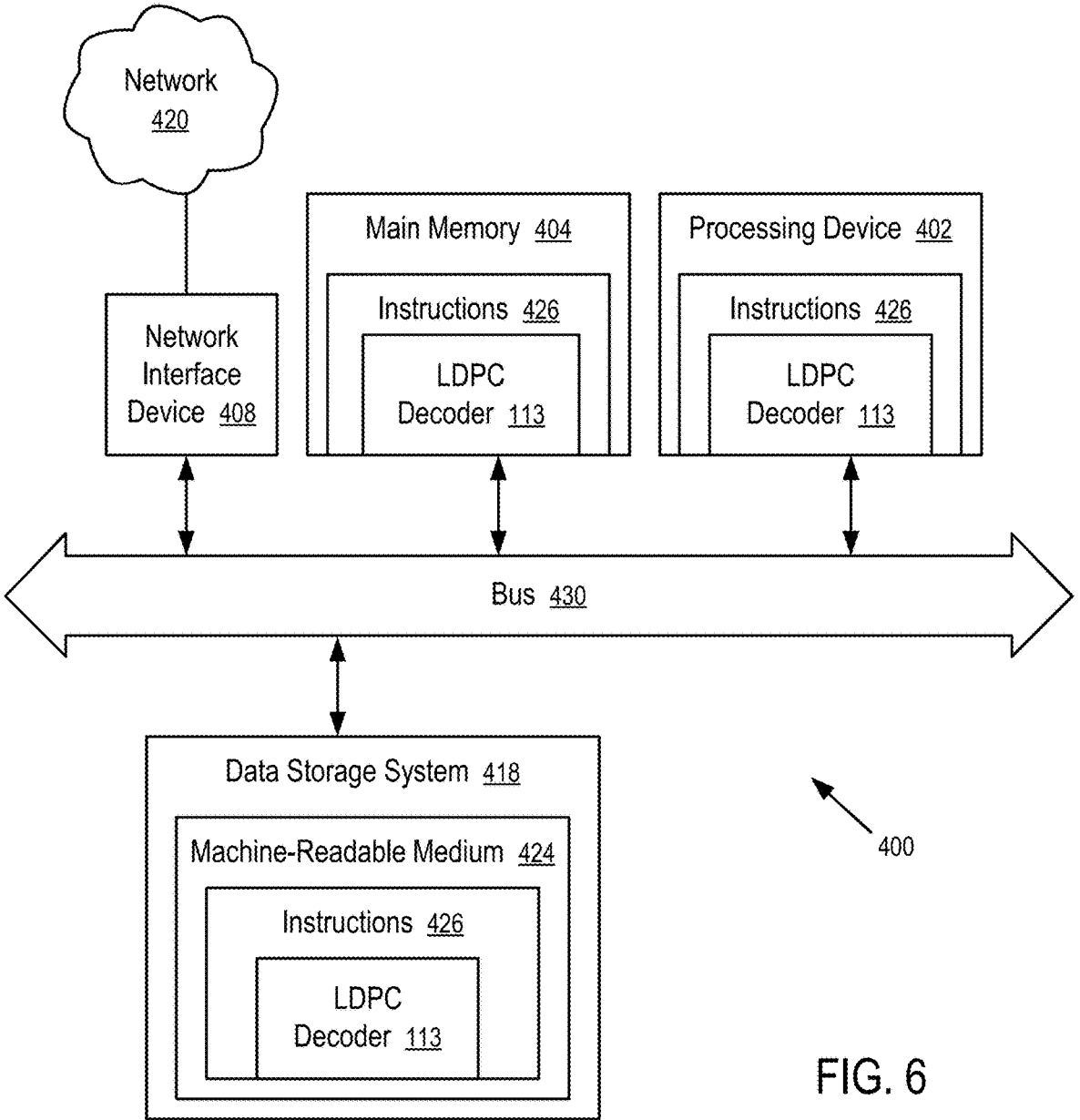
FIG. 6 is a block diagram of an example computer system in which embodiments of the present disclosure can operate.

FIG. 6 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of an LDPC decoder 113 (e.g., to execute instructions to perform operations corresponding to the LDPC decoder 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to an LDPC decoder 113 (e.g., the LDPC decoder 113 described with reference to FIGS. 1-5). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc. In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving a parity matrix;
selecting a single parity column and non-parity columns from the parity matrix as a first plurality of columns;
providing the first plurality of columns as input to a plurality of circuits respectively;
selecting a second plurality of columns containing no parity columns; and
providing a portion of the second plurality of columns as input to the plurality of circuits.

2. The method of claim 1, wherein no more than one parity column is processed in parallel in the pipeline stages in the plurality of circuits.

3. The method of claim 1, wherein at each of a first clock cycle and a second clock cycles, the plurality of circuits process the first plurality of columns respectively in one of the pipeline stages.

4. The method of claim 3, further receiving a codeword with the parity matrix, wherein the codeword includes a plurality of user data bits and a plurality of parity bits computed according to the parity matrix to generate redundant information for the user data bits.

5. The method of claim 4, wherein each parity column of the parity matrix corresponds to one of the plurality of parity bits.

6. The method of claim 5, wherein each non-parity column of the parity matrix corresponds to one of the plurality of user data bits.

7. The method of claim 6, further comprising:
assigning each respective column of the parity matrix to one of the plurality of circuits for processing identified based on an index of the respective column in the parity matrix modulo a count of the plurality of circuits.

8. A decoder, comprising:
a plurality of circuits to perform bit-flipping in decoding a codeword according to a parity matrix;
wherein the decoder is configured, via a logic circuit, to:
select a single parity column and non-parity columns from the parity matrix as a first plurality of columns;
provide the first plurality of columns as input to the plurality of circuits respectively;
select a second plurality of columns containing no parity columns; and
provide a portion of the second plurality of columns as input to the plurality of circuits.

9. The decoder of claim 8, wherein no more than one parity column is processed in parallel in the pipeline stages in the plurality of circuits.

10. The decoder of claim 8, wherein the plurality of circuits is configured to, at each of a first clock cycle and a second clock cycle, process the first plurality of columns respectively in one of the pipeline stages.

11. The decoder of claim 10, wherein the codeword includes a plurality of user data bits and a plurality of parity bits computed according to the parity matrix to generate redundant information for the user data bits.

12. The decoder of claim 11, wherein each parity column of the parity matrix corresponds to one of the plurality of parity bits.

13. The decoder of claim 12, wherein each non-parity column of the parity matrix corresponds to one of the plurality of user data bits.

14. The decoder of claim 13, further configured to assign each respective column of the parity matrix to one of the plurality of circuits for processing identified based on an index of the respective column in the parity matrix modulo a count of the plurality of circuits.

15. An apparatus, comprising:
memory cells;
circuitry configured to identify a codeword;
a plurality of circuits to perform bit-flipping in decoding the codeword according to a parity matrix; and
a logic circuit configured to:
select a single parity column and non-parity columns from the parity matrix as a first plurality of columns;
provide the first plurality of columns as input to the plurality of circuits respectively;

select a second plurality of columns containing no parity columns; and provide a portion of the second plurality of columns as input to the plurality of circuits.

16. The apparatus of claim 15, wherein no more than one parity column is processed in parallel in the pipeline stages in the plurality of circuits.

17. The apparatus of claim 15, wherein the plurality of circuits is configured to, at each of a first clock cycle and a second clock cycle, process the first plurality of columns respectively in one of the pipeline stages.

18. The apparatus of claim 17, wherein the codeword includes a plurality of user data bits and a plurality of parity bits computed according to the parity matrix to generate redundant information for the user data bits.

19. The apparatus of claim 18, wherein each parity column of the parity matrix corresponds to one of the plurality of parity bits; and each non-parity column of the parity matrix corresponds to one of the plurality of user data bits.

20. The apparatus of claim 19, wherein the logic circuit is further configured to assign each respective column of the parity matrix to one of the plurality of circuits for processing identified based on an index of the respective column in the parity matrix modulo a count of the plurality of circuits.

\* \* \* \* \*